(No Model.)
S. B. SCOTT.
TOY BLOCKS.
No. 274,980. Patented Apr. 3, 1883.
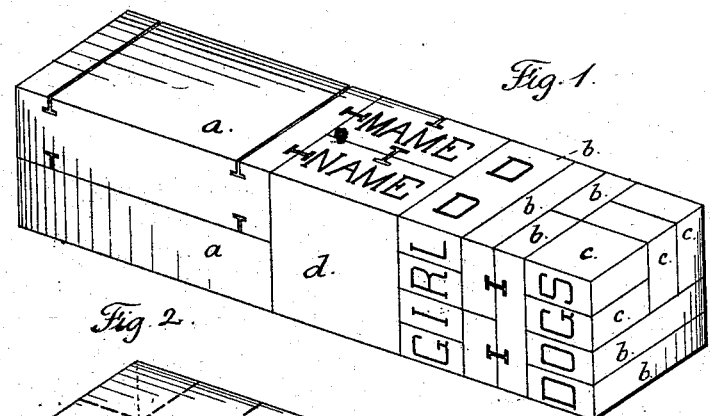
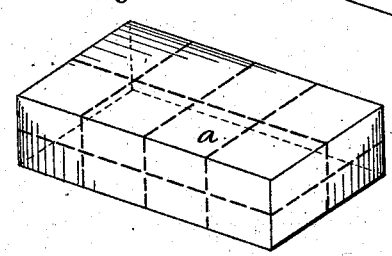
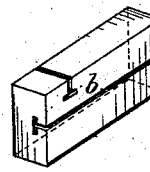
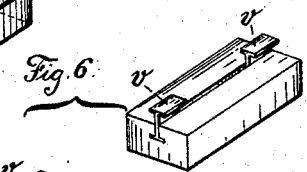
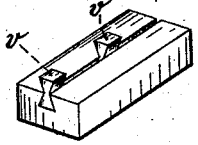
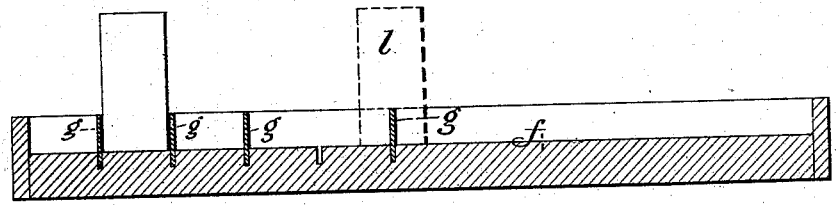
Witnesses:
J. Staib
Chas H. Smith
Inventor:
Seth B. Scott,
per Lemuel W. Serrell
atty

UNITED STATES PATENT OFFICE.

SETH B. SCOTT, OF ORANGE, NEW JERSEY.

TOY BLOCKS.

SPECIFICATION forming part of Letters Patent No. 274,980, dated April 3, 1883.

Application filed September 6, 1882. (No model.)

*To all whom it may concern:*

Be it known that I, SETH B. SCOTT, of Orange, in the State of New Jersey, have invented an Improvement in Toy Blocks, of which the following is a specification.

Toy blocks have been made of wood strips cut up in various lengths, and in some instances one block has been half the length of another block. Blocks have also been made in imitation of bricks and brick-work.

My invention is made for amusement and instruction, and relates to toy blocks having sets of similar rectangular blocks, the dimensions of the blocks of the respective sets bearing a regular relation to each other, so that, taking one of the largest blocks as a standard, each block of the other sizes is one-half, or one-quarter, or one-eighth the measurement in one or all directions. Hence two of the smallest blocks equal one of the next larger blocks, and the blocks all bear a certain relation to the larger blocks, the largest blocks being multiples of the smallest blocks.

By this improvement a child will acquire a correct understanding of solid measure, cubical contents, &c., and form a correct conclusion instinctively of the difference between measurements of superfices and solids. At the same time these toy blocks are a source of great amusement.

In the drawings, Figure 1 is a perspective view, illustrating how the toy blocks compare in measurement one with the other. Fig. 2 is a perspective view of the large-sized block. Fig. 3 is a similar view of the block of half dimensions of the block Fig. 2, and Fig. 4 shows the third-sized block. Fig. 5 is a section of the board, upon which the blocks can be set up as types.

All the blocks bear a certain relation to the smallest blocks. For instance, two of the blocks $c$ placed together flatwise form a cube. Each block, therefore, is half a cube. Two of the blocks $c$ placed together edgewise correspond to one of the blocks $b$. Four of these blocks $b$ correspond to the block $d$, which is a half-cube of a thickness corresponding to the cube of $c$, and of a square corresponding to the length of $b$. The blocks $a$ are the same width and thickness as $d$, but twice the length. Hence they are twice the dimensions of the blocks $b$. Two of the blocks $a$ or $b$ placed edge to edge make a square, and eight of them make a cube.

I make these blocks a means of instruction in spelling by the introduction of letters and syllables upon the surfaces. Illustrations of these letters are given upon the blocks. If the letters or figures are placed upon the ends of the blocks $b$ $d$ they will be level, or nearly so, when set up in the holder or table $f$. The holder or table $f$ is provided with a rim around it, and with saw-cuts across its face at a distance apart slightly more than the thickness of the blocks $d$, and into these saw-cuts movable strips of metal $g$ are placed for holding the types in line. This allows for setting up words or names, or for arithmetical examples, if there are numbers on the ends of the blocks.

I also make use of interlocks $v$, made of thin pieces of metal, with the ends or edges wider than the middle portions, the same being slipped into channels of a corresponding shape cut into the blocks. The interlocks are of metal or similar rigid material, and of either of the forms shown in Fig. 6, the grooves or channels being undercut to receive such interlocks. The blocks held together by these interlocks can only be separated by slipping one block off the other, and they are connected by a reverse movement. Hence the blocks can be put together in such a manner that a very strong toy structure can be set up, and one that can be moved without falling apart.

It is advantageous to mark the surfaces of the larger blocks with lines, as indicated on the surface of the block, Fig. 2, by dotted lines, these lines corresponding to the measurements of smaller blocks, so as to denote upon such larger blocks the number of small blocks contained in it. These marks become guides in placing the blocks together, as well as indicating the relative contacts.

I do not claim toy blocks in which some of the blocks are halves or quarters of other blocks, as such have sometimes existed in sets of toy blocks that contain various other styles and shapes of blocks. Neither do I claim grooves and metal plates for connecting toy blocks together. In my toy, the blocks being in sets, and each block being a multiple of the smallest block and bearing a definite relation to each other both in contents and measurement, the smaller blocks can be placed together to correspond to the larger blocks, and many comparatively difficult geometric problems are mastered intuitively while the child is being amused.

If desired, the ends of the blocks may be made with saw-cuts to set over the edges of the partition-plates $g$, Fig. 5, instead of passing in between them, as indicated by dotted lines at $l$.

I claim as my invention—

1. The toy blocks in sets, each of which blocks is a portion of a cube, and the cubes formed by blocks of one set are half the measurement of cubes formed by blocks of another set, substantially as set forth.

2. The toy blocks each made as a portion of a cube and having letters or figures on one or more of the surfaces, in combination with a table or board having grooves, and the metal strips fitting into such grooves and made removable, substantially as set forth.

3. The toy blocks in sets, the larger blocks all being multiples of the smaller blocks, substantially as and for the purposes set forth.

4. The toy blocks having undercut channels or grooves, in combination with the interlocks $v$, that are wider near the ends or edges than in the middle and fit into such undercut grooves, substantially as set forth.

5. The toy blocks having lines upon their surfaces, for the purposes and as set forth.

Signed by me this 30th day of September, A. D. 1882.

SETH B. SCOTT.

Witnesses:
GEO. T. PINCKNEY,
CHAS. H. SMITH.